(12) United States Patent  (10) Patent No.: US 8,534,159 B2
Laivins et al.  (45) Date of Patent: Sep. 17, 2013

(54) MOVABLE HANDGUARD ASSEMBLY

(76) Inventors: Kenneth T. Laivins, Hebron, OH (US);
Glen A. Laivins, Hebron, OH (US)

( * ) Notice: Subject to any disclaimer, the term of this patent is extended or adjusted under 35 U.S.C. 154(b) by 1865 days.

(21) Appl. No.: 11/416,544

(22) Filed: May 3, 2006

(65) Prior Publication Data
US 2007/0256514 A1  Nov. 8, 2007

(51) Int. Cl.
*B62K 21/12* (2006.01)
*B62J 17/00* (2006.01)
*B62J 23/00* (2006.01)

(52) U.S. Cl.
CPC . *B62J 17/00* (2013.01); *B62J 23/00* (2013.01)
USPC ......................... 74/551.8; 74/551.9

(58) Field of Classification Search
USPC ............... 74/551.8, 551.9, 489, 488; 30/448
See application file for complete search history.

(56) References Cited

U.S. PATENT DOCUMENTS

| | | | | |
|---|---|---|---|---|
| 598,546 A | * | 2/1898 | Wade | 2/17 |
| 1,473,326 A | * | 11/1923 | Slawienski | 74/489 |
| 2,571,310 A | * | 10/1951 | Thiem | 30/448 |
| 3,875,819 A | * | 4/1975 | Haffner | 74/489 |
| 3,982,446 A | * | 9/1976 | Van Dyken | 74/488 |
| 4,137,793 A | * | 2/1979 | Sowell | 74/488 |
| 4,141,567 A | | 2/1979 | Scott | |
| 4,875,386 A | * | 10/1989 | Dickerson | 74/551.9 |
| D319,992 S | | 9/1991 | Acerbis | |
| 5,832,786 A | | 11/1998 | Risley | |
| 6,505,877 B1 | | 1/2003 | Devlin et al. | |
| 6,752,447 B2 | * | 6/2004 | Gagne | 296/92 |
| D492,623 S | | 7/2004 | DeLanghe et al. | |
| 6,808,219 B2 | | 10/2004 | Barber et al. | |
| 2004/0173046 A1 | | 9/2004 | Hancock et al. | |
| 2004/0217243 A1 | | 11/2004 | Laivins et al. | |
| 2005/0040621 A1 | | 2/2005 | Paris et al. | |
| 2009/0314125 A1 | * | 12/2009 | Mentasti | 74/551.8 |
| 2012/0234129 A1 | * | 9/2012 | Adan | 74/551.8 |

FOREIGN PATENT DOCUMENTS

| | | | |
|---|---|---|---|
| EP | 2 384 960 A1 | * | 11/2011 |
| GB | 480985 | * | 3/1938 |
| GB | 636349 | * | 4/1950 |

* cited by examiner

*Primary Examiner* — Vinh Luong
(74) *Attorney, Agent, or Firm* — Benesch Friedlander Coplan & Aronoff, LLP

(57) ABSTRACT

One embodiment of a handguard assembly includes an arm, a shield connected to the arm, and a biasing member between the arm and the shield. The biasing member is configured to bias the shield towards a position.

20 Claims, 6 Drawing Sheets

MOVABLE HANDGUARD ASSEMBLY

FIELD OF INVENTION

The present application relates to a handguard for a handlebar. In particular, the present application relates to a pivotal handguard for a handlebar of a vehicle, such as a motorbike, motorcycle, motor scooter, bicycle, or all-terrain vehicle ("ATV").

BACKGROUND

Handguards for protecting the hands of riders of motorbikes, motorcycles, motor scooters, bicycles, and ATVs are known in the art. The handguard is configured to protect a rider's hands from debris as well as wind and rain. In one known embodiment, the handguard includes a shield member having a first end and a second end, wherein each end is rigidly connected to a handlebar of a vehicle.

BRIEF DESCRIPTION OF THE DRAWINGS

The accompanying drawings, together with the detailed description provided below, describe exemplary embodiments of the claimed invention. Like elements are identified with the same reference numerals. The drawings are not to scale and the proportion of certain elements may be exaggerated for the purpose of illustration.

DETAILED DESCRIPTION

"Right" and "left" as used herein refer to the right and left directions as viewed from the perspective of a rider of the vehicle.

An "inner" direction as used herein refers to a direction towards the body of the vehicle.

An "outer" direction as used herein refers to a direction away from the body of the vehicle.

Figure 1:
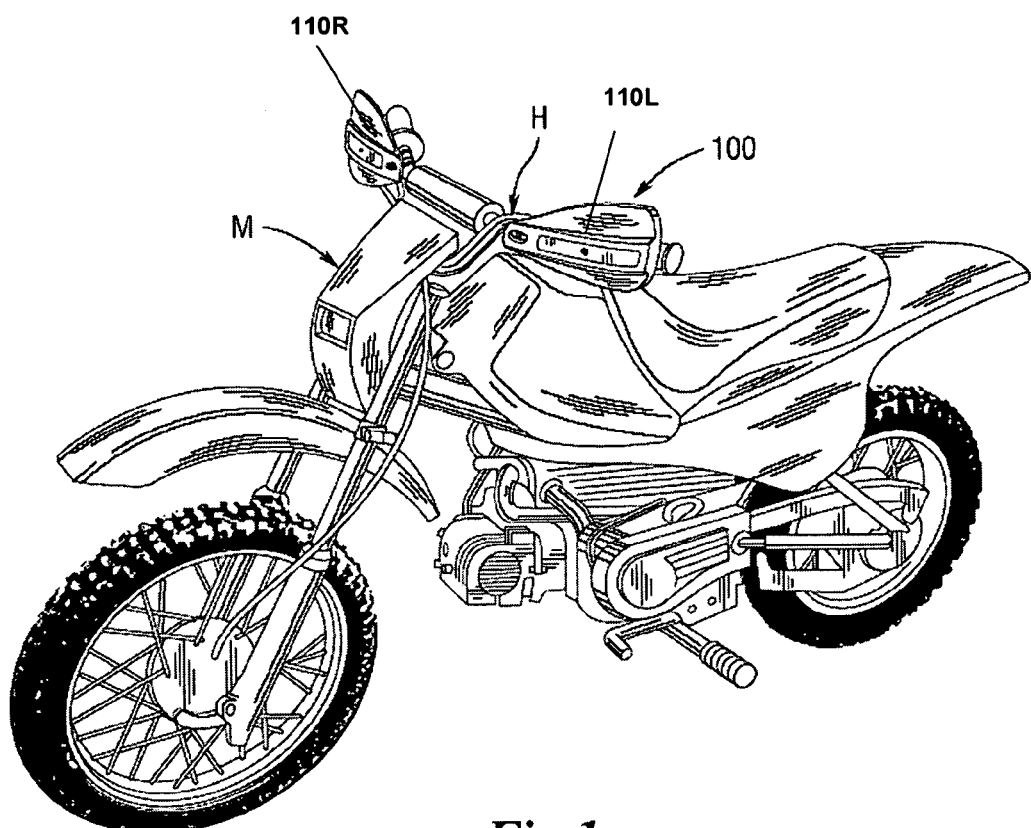
FIG. 1 is a perspective view of one embodiment of a handguard assembly mounted on a motorcycle.

FIG. 1 illustrates a simplified perspective view of one embodiment of a handguard assembly 100, including left and right handshields 110L,R mounted on a handlebar H of a motorbike M. In this embodiment, the handguard assembly 100 is positioned in front of the handlebar H to protect a rider's hand. In alternative embodiments, the handguard assembly 100 may be employed on a motorcycle, motor scooter, bicycle, ATV, or any other vehicle having handlebars.

In one embodiment, the shields 110L,R are constructed of a polymeric material. Exemplary polymeric materials include, without limitation, polypropylene, polyethylene, ethylene propylene diene monomer (EPDM) elastomeric, or a combination thereof. Polypropylene provides stiffness to the shields while polyethylene provides resilience and EPDM elastomeric provides flexibility. In an alternative embodiment (not shown), the shields are constructed of metal.

If each shield 110L,R is constructed of a polymeric material, it can be molded to include complex features and to facilitate installation on a handlebar H. Furthermore, the use of a polymeric material allows each shield 110L,R to absorb impacts and retain its shape.

Figure 2:
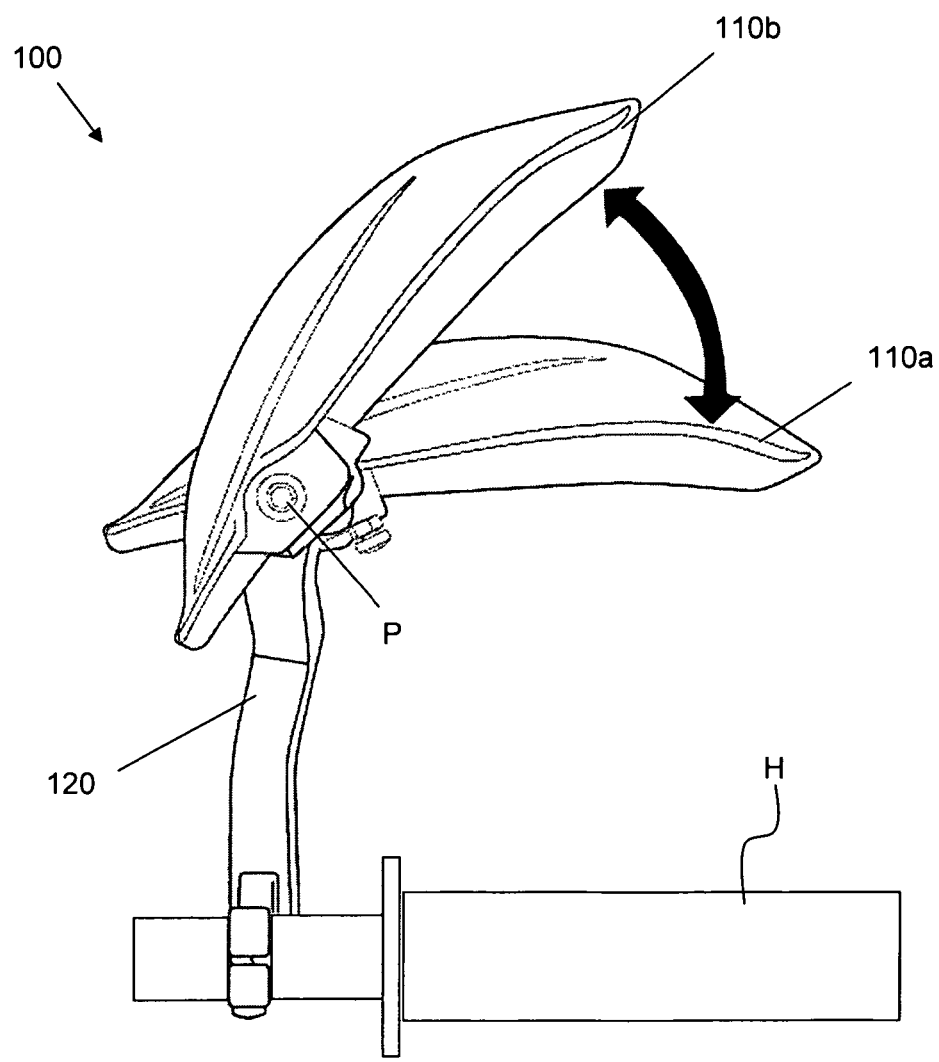
FIG. 2 is a top elevation view of one embodiment a handguard assembly mounted on a handlebar.

FIG. 2 illustrates a top view of one embodiment of the handguard assembly 100 connected to the handlebar H. In the illustrated embodiment, the shield 110 is connected to the handlebar H via an arm 120. The shield 110 is configured to move from a first position 110a to a second position 110b. In one embodiment, the shield 110 is placed in the first position 110a under normal conditions and is moved to the second position 110b when an external force is applied to an outer portion of the shield 110.

In the illustrated embodiment, the shield 110 moves by pivoting about a pivot point P. In an alternative embodiment (not shown), the shield translates by sliding from a first position to a second position. In another alternative embodiment (not shown), the shield is configured to both pivot and translate.

Figure 3:
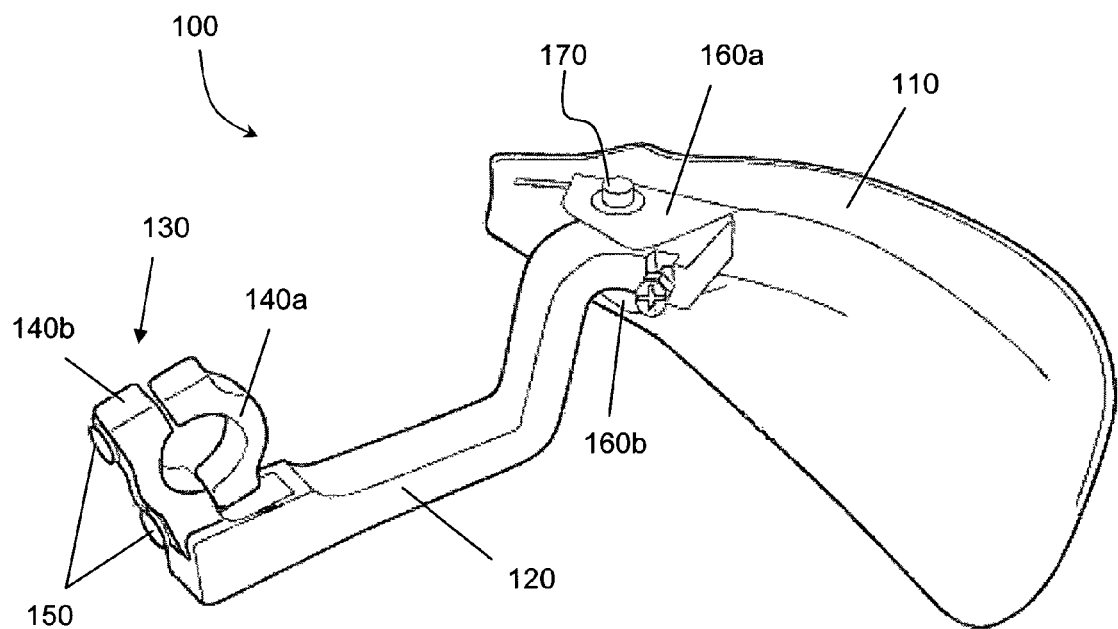
FIG. 3 is a perspective view of one embodiment of a handguard assembly.

FIG. 3 illustrates a perspective view of one embodiment of a handguard assembly 100. In the illustrated embodiment, the handguard assembly 100 includes the shield 110 and arm 120, and further includes a mount 130. In various embodiments, the arm 120 and/or the mount 130 is constructed of aluminum. In alternative embodiments, at least one of the arm 120 and mount 130 is constructed of steel, iron, or any other known metal or alloy. In another alternative embodiment, at least one of the arm 120 and mount 130 is constructed of a polymeric material. The arm 120 and the mount 130 may be constructed of the same material or of different material.

As shown in the illustrated embodiment, the mount 130 is a separate component connected to the arm 120. The mount 130 is configured to be connected to either the handlebar (not shown) or perch (not shown) of a vehicle. In the illustrated embodiment, the mount 130 includes first and second C-shaped portions 140a,b. In an alternative embodiments (not shown), the mount may be a unitary O-shaped member or a pair of pivotally connected members.

In one embodiment the mount 130 is pivotally connected to the arm 120 via a pin or shaft (not shown). The mount 130 is then locked into position by a set screw, a locking pin, a locking washer, or other known locking mechanism. In an alternative embodiment, the mount 130 is pivotally connected to the arm 120 via a bolt or screw (not shown). In another alternative embodiment, the mount 130 is fixedly connected to the arm 120 via one or more bolts, screws, pins, nails, ties, or adhesive. In another alternative embodiment (not shown), the mount is an extension of a unitary arm member.

With continued reference to FIG. 3, the C-shaped portions 140a,b are configured to be connected to each other via one or more bolts 150. In alternative embodiments (not shown), the C-shaped portions may be connected by screws, ties, or any other appropriate connecting members. In the illustrated embodiment, the C-shaped portions 140a,b of mount 130 are disposed in an upright configuration. In an alternative embodiment illustrated (not shown), the C-shaped portions are disposed horizontally. In other alternative embodiments (not shown), the C-shaped portions may be disposed in any orientation.

In FIG. 3, the arm 120 is pivotally connected to the shield 110. In the illustrated embodiment, the shield 110 includes a top projection 160a and a bottom projection 160b. The arm 120 is configured to be received between the top and bottom projections 160*a,b*. In an alternative embodiment, the shield includes a single projection and the arm includes a top and bottom projection. In another alternative embodiment, the shield includes a single projection and the arm is disposed above or below the projection. In an alternative embodiment (not shown), the arm is slidably connected to the shield. In another alternative embodiment, the arm is both pivotally and slidably connected to the shield.

With continued reference to FIG. 3, the top projection 160*a* and the bottom projection 160*b* of the shield 110 include aligned apertures configured to receive a pin 170 in a generally vertical orientation. The arm 120 includes a corresponding aligned aperture configured to receive the pin 170 such that the arm is pivotally connected to the shield 110. In alternative embodiments, the arm 120 and shield 130 are configured to receive a shaft or other known pivoting members.

In one embodiment, the pin 170 is configured to receive a locking mechanism (not shown) to hold the pin 170 in place and maintain the pivotal connection. Exemplary locking mechanisms include ties, pins, locking washers, or threaded nuts. In an alternative embodiment (not shown), the arm includes a pair of projections configured to be received in the apertures of the first and second projections of the shield. In another alternative embodiment (not shown), the apertures of the first and second projections of the shield are elongated, thus allowing translational movement between the arm and the shield. In yet another alternative embodiment, the arm includes an elongated aperture configured to receive a pin, thus allowing translational movement between the arm and the shield.

Figure 4:
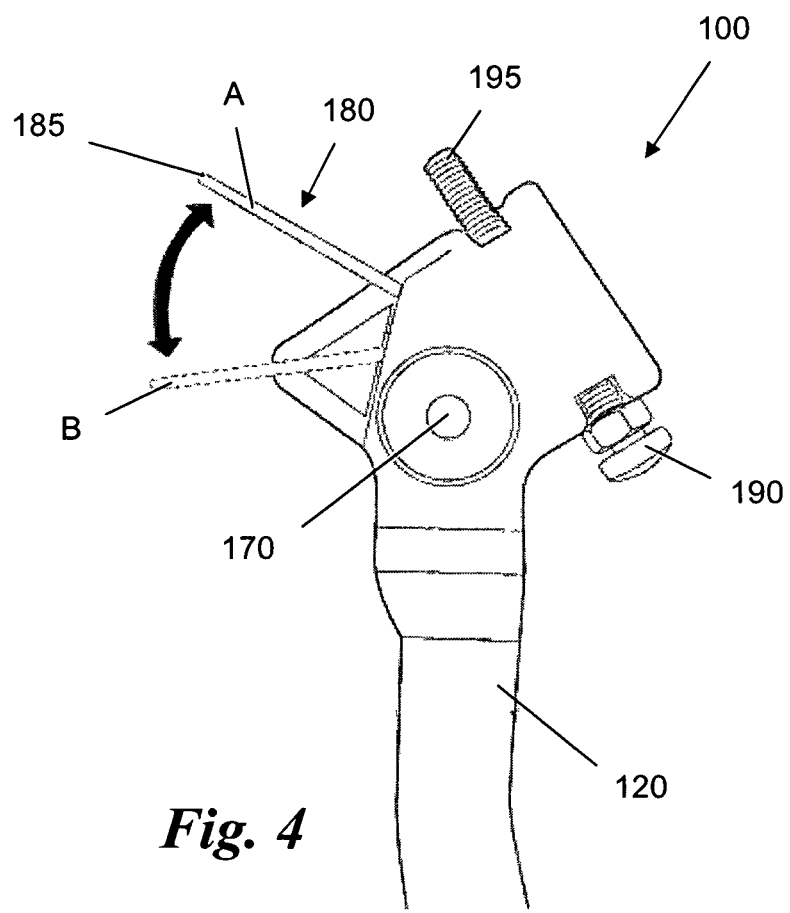
FIG. 4 is a top elevation view of a portion of one embodiment of a handguard assembly.
Figure 5:
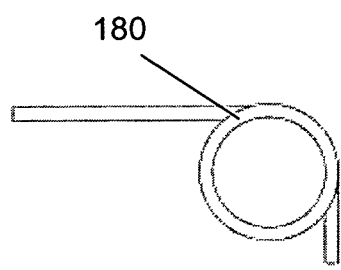
FIG. 5 is a top view of a torsion spring for a handguard assembly.

FIG. 4 illustrates a top elevation view of one embodiment of a portion of the arm 120 of the handguard assembly 100. In the illustrated embodiment, the arm 120 is connected to a torsion spring 180. A detailed view of an exemplary torsion spring is further illustrated in FIG. 5. In alternative embodiments (not shown), the arm may be connected to a spring, a elastomeric member, a piston and cylinder assembly, or any other known biasing member.

Referring back to FIG. 4, the torsion spring 180 is disposed about the pin 170. A first end (not shown) of the torsion spring 180 abuts a portion of the arm 120. A second end 185 of the torsion spring 180 extends away from the arm 120 to contact the shield (not shown). The torsion spring 180 thus biases the shield in a clockwise direction about the pin 170. The second end 185 of the torsion spring 180 is configured to be moved from a first position A to a plurality of other positions, including second position B.

In one embodiment, the torsion spring 180 is in stable equilibrium in the first position A. In other words, a force must be applied to the torsion spring 180 to move its second end 185 from the first position A towards the second position B. When the force is removed, the second end 185 automatically returns to the first position A. In an alternative embodiment (not shown), the arm includes a latch, a notch, or other such retaining mechanism to hold the second end 185 of the torsion spring 180 in place at the second position B. In this embodiment, a second force must be applied to the torsion spring 180 to move the second end 185 from the second position B to the first position A.

In another alternative embodiment (not shown), the torsion spring 180 is in stable equilibrium in the second position B and the arm includes a latch, a notch, or other such retaining mechanism to hold the second end 185 of the torsion spring 180 in place at the first position A. In this embodiment, a force must be applied to the torsion spring 180 to move its second end 185 from the first position A towards the second position B. Additionally, a second force must be applied to the torsion spring 180 to move its second end 185 from the second position B towards the first position A.

As shown in FIG. 4, the arm also includes a set screw 190 configured to abut the shield (not shown) and place the shield in a selected orientation relative to the handlebar (not shown). In alternative embodiments, the arm may include a ratcheted member or other known adjustment members. The end 195 of the set screw 190 extends away from the arm to contact the shield 110 (not shown).

Figure 6A:
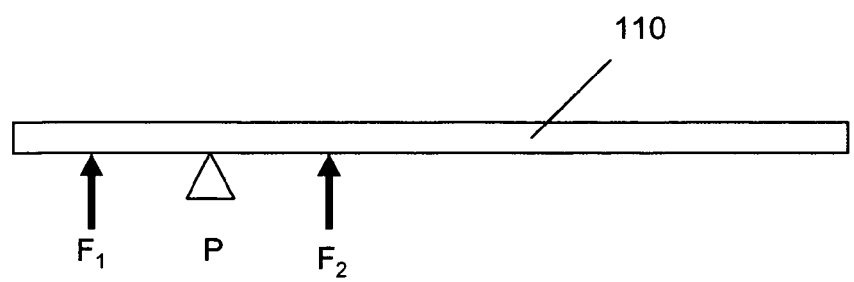
FIGS. 6A-C are simplified force diagrams illustrating exemplary forces applied to a shield of one embodiment of a handguard assembly.
Figure 6B:
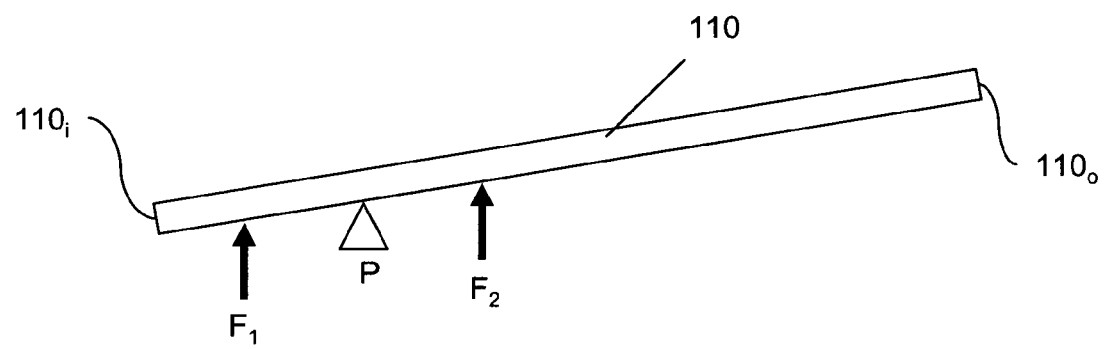
Figure 6C:
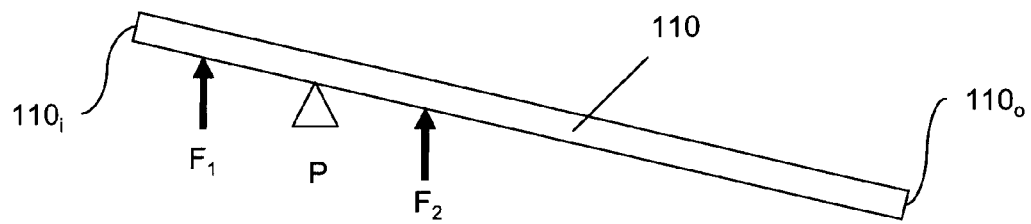

With continued reference to FIG. 4, the second end 185 of the torsion spring 180 applies a first force to the shield (not shown) and the end 195 of the set screw 190 applies a second force to the shield (not shown). FIGS. 6A-6C are simplified force diagrams illustrating the forces acting on the shield 110. The first force exerted by the torsion spring 180 is illustrated as $F_1$ and the second force exerted by the set screw 190 is illustrated as $F_2$. Further, the pin 170 of FIG. 4 is shown as pivot point P.

Because the forces $F_1$, $F_2$ are applied on opposite sides of the pivot point P the shield 110 is placed in a stable equilibrium. The rider may adjust the set screw, thereby adjusting the position at which stable equilibrium is achieved. For example, FIG. 6A illustrates a setting where the set screw 190 is adjusted to position the shield 110 generally parallel to the handlebar (not shown). FIG. 6B illustrates a setting where the set screw 190 is adjusted to position an inner portion $110_i$ of the shield 110 closer to the handlebar (not shown) than an outer portion $110_o$. FIG. 6C illustrates a setting where the set screw 190 is adjusted to position the outer portion $110_o$ of the shield 110 closer to the handlebar (not shown) than the inner portion $110_i$.

Figure 7:
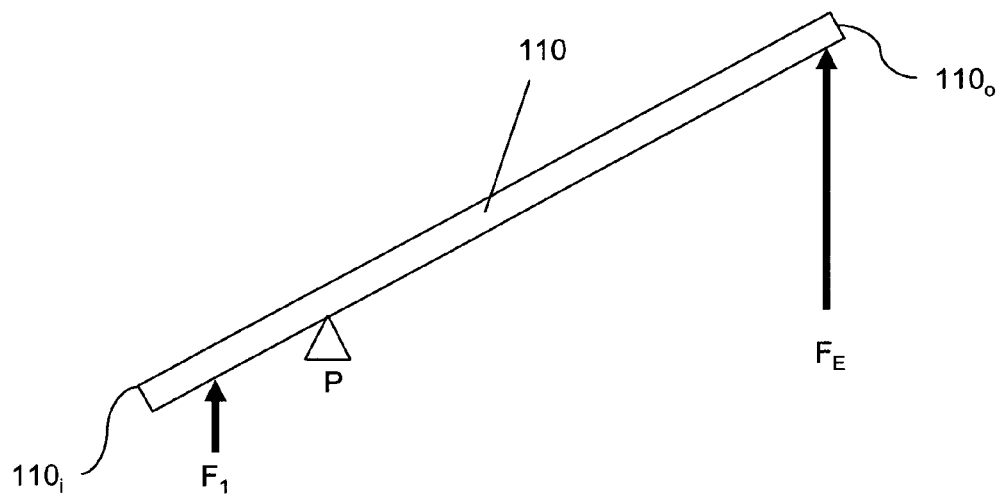
FIG. 7 is a simplified force diagram illustrating an external force applied to a shield of one embodiment of a handguard assembly.

FIG. 7 is a simplified force diagram illustrating an external force $F_E$ applied to the outer portion $110_o$ of the shield 110, wherein the external force $F_E$ has a greater moment than the second force $F_2$ applied by the set screw 190. When this is the case, the outer portion $110_o$ of the shield 110 will pivot forward such that the set screw 190 no longer contacts the shield 110. In other words, referring back to FIG. 2, when an external force is applied, the shield 110 pivots from a first position 110*a* to a second position 110*b*.

With continued reference to both FIG. 2 and FIG. 7, in one embodiment the shield 110 returns to the first position 110*a* when the external force $F_E$ is removed. In another embodiment, the arm 120 includes a latch, a notch, or another known retaining mechanism (not shown) to keep the shield 110 in the second position 110*b* after the external force $F_E$ is removed. In this embodiment, the shield 110 returns to the first position 110*a* when an additional force is applied to the outer portion of the shield 110, in a direction opposite that of the external force $F_E$.

The external force $F_E$ may be applied by various sources. For example, if the vehicle falls down while traveling uphill, the vehicle may slide backwards down the hill. In this instance, the ground applies the external force $F_E$. In another example, if the vehicle collides with an object, the rider may be thrown forward from the vehicle and the rider may strike the outer portion $110_o$ of the shield 110, thereby applying an external force $F_E$. In yet another example, the outer portion $110_o$ of the shield 110 may strike an object while the vehicle is traveling in reverse. In another example, debris or other foreign objects may strike the outer portion $110_o$ of the shield 110 from the rear.

By pivoting to a second position 110*b*, the shield 110 absorbs impacts without suffering as much damage as it otherwise would. Further, when the shield 110 pivots, more space is created between the shield 110 and the handlebar H, thereby creating more clearance for a rider to remove his hand from the handlebar H.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A pivotal handguard assembly for a vehicle, the handguard assembly comprising:
   an arm member;
   means for shielding a hand of a rider of the vehicle, the means for shielding pivotally connected to the arm member at a pivot point, and configured to move between a first position and a second position;
   a biasing member provided between the arm member and the means for shielding, and configured to bias the means for shielding towards the first position.

2. The pivotal handguard assembly of claim 1, further comprising a mount configured to connect the arm member to the vehicle.

3. The pivotal handguard assembly of claim 2, wherein the mount is an integral portion of the arm member.

4. The pivotal handguard assembly of claim 2, wherein the mount is configured to connect the arm member to one of a handlebar and a perch of the vehicle.

5. The pivotal handguard assembly of claim 1, wherein the vehicle is one of a motorbike, motorcycle, motor scooter, bicycle, and an all-terrain vehicle.

6. The pivotal handguard assembly of claim 1, wherein the biasing member is one of a torsion spring, a spring, a elastomeric member, and a piston and cylinder assembly.

7. The pivotal handguard assembly of claim 1, further comprising an adjustment member configured to adjust the angle of the means for shielding relative to a handlebar of the vehicle when the means for shielding is in the first position.

8. The pivotal handguard assembly of claim 7, wherein the adjustment member is a set screw.

9. The pivotal handguard assembly of claim 1, wherein the means for shielding is configured to pivot about the pivot point when an external force is applied to the means for shielding and is further configured to return to the first position when the external force is removed.

10. A kit for a handguard mounting assembly configured to be connected to a vehicle and further configured to be connected to a handshield, the kit comprising:
    an arm configured to be pivotally connected to a handshield;
    a biasing member configured to be connected to the arm and further configured to interact with the handshield.

11. The handguard kit of claim 10, further comprising an adjustment member configured to adjust the angular position of the handshield relative to the arm.

12. The handguard kit of claim 10, further comprising a mounting member configured to mount the arm to the vehicle.

13. The handguard kit of claim 10, wherein the biasing member is one of a torsion spring, a spring, a elastomeric member, and a piston and cylinder assembly.

14. A handguard assembly comprising:
    an arm;
    a shield connected to the arm; and
    a biasing member disposed between the arm and the shield and configured to bias the shield towards a preselected position.

15. The handguard assembly of claim 14, further comprising means for mounting the handguard assembly to one of a handlebar and a perch of a vehicle.

16. The handguard assembly of claim 15, wherein the vehicle is one of a motorbike, a motorcycle, an all-terrain vehicle, and a bicycle.

17. The handguard assembly of claim 14, wherein the shield is movably connected to the arm.

18. The handguard assembly of claim 17, wherein the shield is pivotally connected to the arm.

19. The handguard assembly of claim 17, wherein the biasing member is configured to move the shield to the preselected position when the shield is moved out of the preselected position.

20. The handguard assembly of claim 14, wherein the biasing member is one of a torsion spring, a spring, a elastomeric member, and a piston and cylinder assembly.

* * * * *